United States Patent
Hong et al.

(10) Patent No.: US 10,454,825 B2
(45) Date of Patent: Oct. 22, 2019

(54) HYBRID ROUTING TABLE FOR ROUTING NETWORK TRAFFIC

(71) Applicant: Nicira, Inc., Palo Alto, CA (US)

(72) Inventors: Xinhua Hong, Campbell, CA (US); David Leroy, Palo Alto, CA (US); Yong Wang, San Jose, CA (US); Jia Yu, San Jose, CA (US)

(73) Assignee: Nicira, Inc., Palo Alto, CA (US)

( * ) Notice: Subject to any disclaimer, the term of this patent is extended or adjusted under 35 U.S.C. 154(b) by 0 days.

(21) Appl. No.: 15/807,042

(22) Filed: Nov. 8, 2017

(65) Prior Publication Data
US 2019/0140951 A1    May 9, 2019

(51) Int. Cl.
*H04L 12/743* (2013.01)
*H04L 12/741* (2013.01)

(52) U.S. Cl.
CPC .......... *H04L 45/7453* (2013.01); *H04L 45/74* (2013.01); *H04L 45/745* (2013.01)

(58) Field of Classification Search
CPC ... H04L 45/7453; H04L 45/74; H04L 45/745; H04L 45/748
USPC .......................................................... 370/329
See application file for complete search history.

(56) References Cited

U.S. PATENT DOCUMENTS

| | | | |
|---|---|---|---|
| 6,212,184 B1 | 4/2001 | Venkatachary et al. | |
| 7,921,088 B1 | 4/2011 | Mittal | |
| 7,984,038 B2* | 7/2011 | Bass ................. | G06F 17/30985 707/712 |
| 7,990,979 B2 | 8/2011 | Lu et al. | |
| 8,572,140 B1 | 10/2013 | Mittal | |
| 9,680,749 B2* | 6/2017 | Labonte ................ | H04L 45/748 |
| 2006/0083247 A1 | 4/2006 | Mehta | |
| 2014/0052704 A1 | 2/2014 | Mittal | |
| 2016/0014023 A1* | 1/2016 | He .......................... | H04L 45/54 370/408 |

* cited by examiner

*Primary Examiner* — Yemane Mesfin
*Assistant Examiner* — Intekhaab A Siddiquee

(57) ABSTRACT

The technology disclosed herein enables network traffic routing using a hybrid routing table. In a particular embodiment, a method provides adding a first portion of a network prefix to one or more tiers of one or more tries in the hybrid routing table. Upon reaching a lowest node of the one or more tries when adding the first portion of the network prefix, the method provides adding key information to the lowest node. The key information and at least a second portion of the network prefix comprise a key to locate a value in a hash table of the hybrid routing table. The value indicates routing information for the network prefix. Additionally, the method provides routing packets using the hybrid routing table.

20 Claims, 6 Drawing Sheets

HYBRID ROUTING TABLE FOR ROUTING NETWORK TRAFFIC

TECHNICAL BACKGROUND

Internet Protocol version 6 (IPv6) packet routing in logical and virtual network systems can be more challenging than packet routing in physical network appliances. The main challenges stem from the large number of logical routers that may be implemented in a logical network. Each of the logical routers uses a routing table to determine where packets received at the router should be transferred. The routing table for each logical router is stored in memory and, especially in cases where a large number of logical routers are implemented, large amounts of memory may be used to store the routing tables. Similarly, with a large number of routers to which packets may be transferred, performance of looking up routing information also becomes a factor.

Additionally, packet routing in logical networks does not necessarily follow the same constraints as packet routing in physical networks. For example, Tier0 logical routers comply with the address prefix length requirements of a physical network, since Tier0 routers bridge between logical and physical networks, and the prefix link is not controlled by a user. However, Tier1 logical routers route between logical networks of a data center. An administrator of that data center can therefore customize the network prefix lengths used by the subnets therein and the routing tables used by the logical routers would need to account for those customized prefixes.

SUMMARY

The technology disclosed herein enables network traffic routing using a hybrid routing table. In a particular embodiment, a method provides adding a first portion of a network prefix to one or more tiers of one or more tries in the hybrid routing table. Upon reaching a lowest node of the one or more tries when adding the first portion of the network prefix, the method provides adding key information to the lowest node. The key information and at least a second portion of the network prefix comprise a key to locate a value in a hash table of the hybrid routing table. The value indicates routing information for the network prefix. Additionally, the method provides routing packets using the hybrid routing table.

In some embodiments, routing packets using the hybrid routing table comprises receiving a packet addressed to a network address having the network prefix, traversing the one or more tiers of tries using the first portion of the network prefix, using the key to locate the value in the hash table, and sending the packet to a next hop indicated by the routing information.

In some embodiments, the method provides inputting the key information and the second portion of the network prefix as inputs into a hash function, resulting in the key being generated as output of the hash function.

In some embodiments, the key information includes a Virtual Routing and Forwarding (VRF) identifier.

In some embodiments, the first portion of the network prefix comprises the outer 32 bits of an Internet Protocol version 6 (IPv6) network address. In those embodiments, the second portion of the network prefix may include a remaining 0 to 32 bit portion of the network prefix.

In some embodiments, the one or more tries comprises a 4 level trie with each level representing 8 bits.

In some embodiments, the value comprises a pointer to the routing information.

In some embodiments, adding the first portion to the one or more tiers of one or more tries comprises, at each trie node of the one or more tries that is traversed, other than the origin node, including a previous node indicator, which indicates the previous trie node in the traversal.

In some embodiments, the value further indicates the lowest node. In those embodiments, the method further provides removing the routing information from the routing table. Removing the routing information in those embodiments comprises deleting the routing information and the value, identifying the lowest node as indicated by the value, and from the lowest node upward, using the previous node indicator included at each trie node to remove the first portion from the one or more tries.

In another embodiment, an apparatus is provided having one or more computer readable storage media and a processing system operatively coupled with the one or more computer readable storage media. Program instructions stored on the one or more computer readable storage media, when read and executed by the processing system, direct the processing system to add a first portion of a network prefix to one or more tiers of one or more tries in the hybrid routing table and, upon reaching a lowest node of the one or more tries when adding the first portion of the network prefix, add key information to the lowest node. The key information and at least a second portion of the network prefix comprise a key to locate a value in a hash table of the hybrid routing table. The value indicates routing information for the network prefix. Furthermore, the program instructions direct the processing system to route packets using the hybrid routing table.

DETAILED DESCRIPTION

The hybrid routing table used to route packets herein combines the features of tries and hash tables to strike a balance between lookup performance using the hybrid routing table and memory used by the hybrid routing table. Moreover, a hybrid routing table is able to account for the varying address prefix lengths allowed in logical networks. Specifically, the trie portion of the hybrid routing table is used to perform longest prefix match (LPM) on prefix portions that may differ between subnets in a data center's logical network while a hash table is used to cover the remaining bits of a network prefix not accounted for in the trie portion. Thus, while tries and hash tables have been used independently in the past for routing lookups (e.g., for much shorter IPv4 network addresses), the combination of both tries and hash tables for a hybrid routing table, in the manner provided below, allows for a compromise between lookup performance and memory used by the hybrid routing table.

Figure 1:
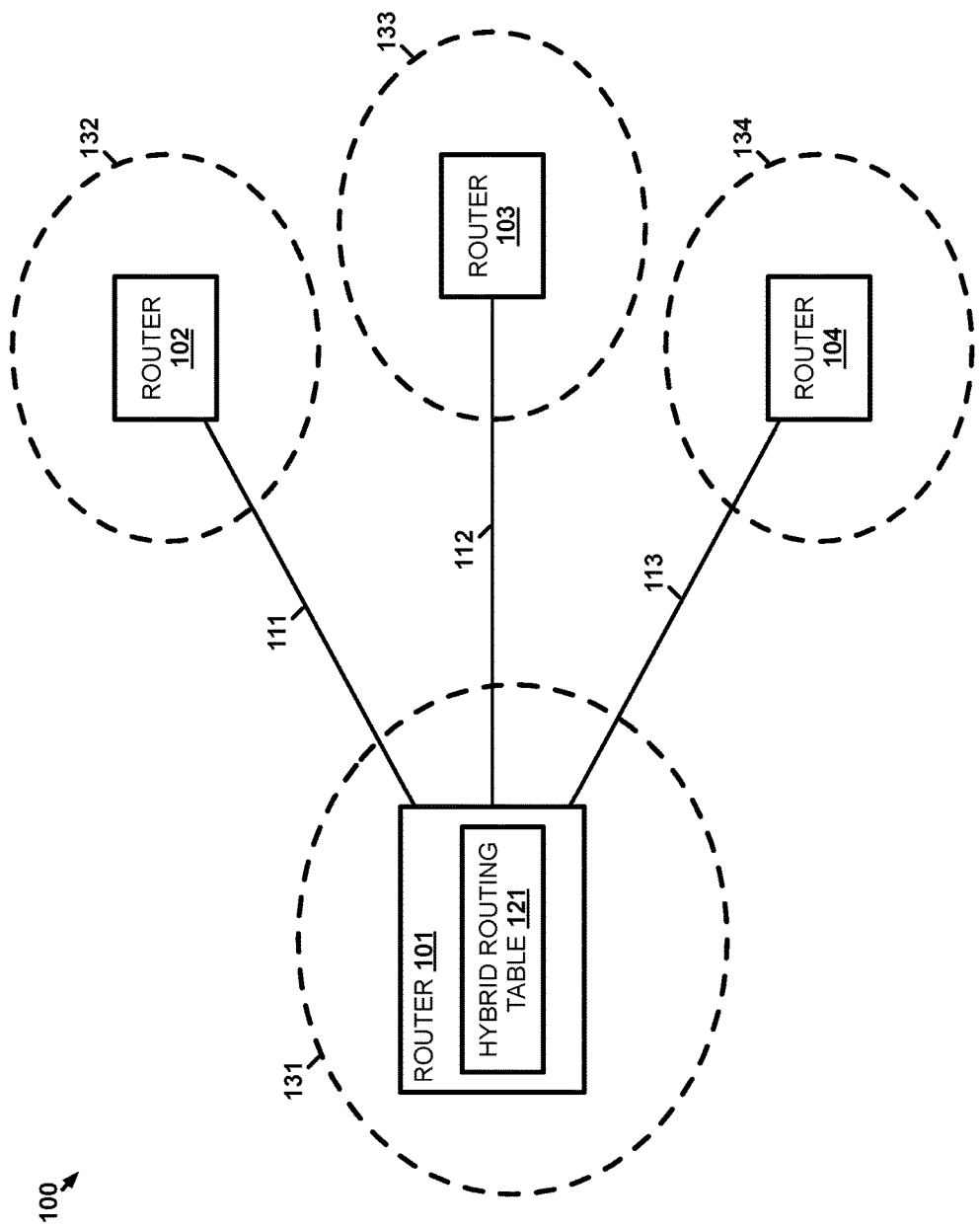
FIG. 1 illustrates an implementation for routing network traffic using a hybrid routing table.

FIG. 1 illustrates implementation 100 for routing network traffic using a hybrid routing table. Implementation 100 includes logical router 101, logical router 102, logical router 103, and logical router 104. Logical router 101 and logical router 102 communicate over logical communication link 111. Logical router 101 and logical router 103 communicate over logical communication link 112. Logical router 101 and logical router 104 communicate over logical communication link 113. While not shown, logical communication links may similarly connect between logical router 102, logical router 103, and logical router 104.

In operation, logical router 101, logical router 102, logical router 103, and logical router 104 route network packet traffic between endpoints of one or more logical networks. It should be understood that logical router 101, logical router 102, logical router 103, and logical router 104 may be implemented as physical network routers with their own memory, processing, and network communication circuitry, or may be implemented by executing as virtualized network elements on host computing systems, which provide the processing circuitry, storage media, physical network interfaces, etc. that are used by the virtualized computing elements thereon. Logical networks overlay on top of physical networks to provide near limitless network configurations. A network using IPv6 operates at layer 3 of the Open System Interconnection network model as an overlay of layer 2.

Each logical router implements a subnet domain identified by a IPv6 network prefix. Logical router 101 implements subnet domain 131, logical router 102, implements subnet domain 132, logical router 103 implements subnet domain 133, and logical router 104 implements subnet domain 134. Logical router 101, logical router 102, logical router 103, and logical router 104 may also implement other logical domains as is allowed by virtual routing and forwarding (VRF) in IP. Logical router 101 stores hybrid routing table 121, which is used by logical router 101 to determine where a received packet should be routed based on the prefix of the packet's network address. For example, a packet received by logical router 101 from an element within subnet domain 131 (e.g., a computer, server, switch, etc.) may be directed to an IPv6 network address having a prefix assigned to subnet domain 134. logical router 101 uses hybrid routing table 121 to determine that packets having the prefix assigned to subnet domain 134 should be routed to logical router 104 and transfers the packet over logical communication link 113 to logical router 104 accordingly. While not shown, logical router 102, logical router 103, and logical router 104 each also have a hybrid routing table that is used to route packets from their respective subnet domain 132, subnet domain 133, and subnet domain 134.

Figure 2:
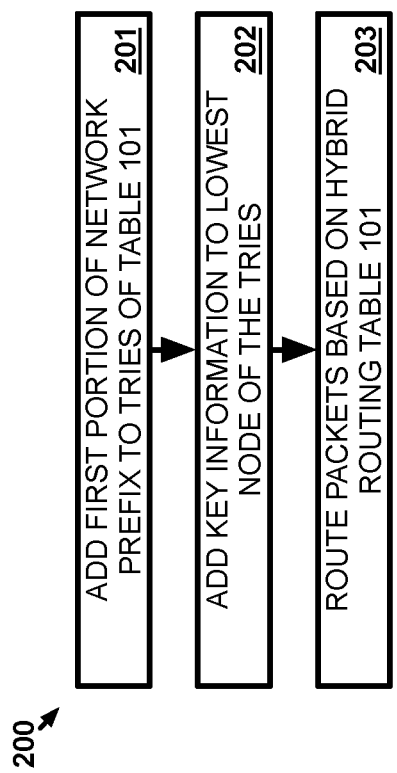
FIG. 2 illustrates a scenario for the implementation to route network traffic using a hybrid routing table.

FIG. 2 illustrates scenario 200 for implementation 100 to route network traffic using a hybrid routing table. In particular, scenario 200 describes how a new route may be added to hybrid routing table 121 for use when routing packets. For example, logical router 102 may broadcast a IPv6 address prefix for subnet domain 132 to all neighboring logical routers, including logical router 101. Upon receiving the broadcast, logical router 101 knows that network packets directed to the network prefix for subnet domain 132 should be routed to logical router 102 and that route to logical router 102 should be stored in hybrid routing table 121 for reference.

To add a route to hybrid routing table 121, scenario 200 provides logical router 101 adding a first portion of the network prefix to one or more tiers of one or more tries in the hybrid routing table (201). A trie is a tree-type data structure where the value at each node is combined with the values of that node's ancestor nodes. In this case, the value of each node traversed in the trie will comprise one or more bits of an address prefix with each subsequently traversed child node having its bits included in the network prefix. The one or more tries may be single bit tries that require less memory but tend to have a lower lookup performance due to having one node traversal per bit. Accordingly, the one or more tries are, preferably, multi-bit tries, such as the 8-bit tries described below, that balance lookup performance and memory used to store the trie in logical router 101. The trie may be a compressed or non-compressed trie.

To add a network prefix to the one or more tries, logical router 101 adds the outermost bits of the network prefix to the root node of the first trie. The number of bits corresponds to the number of bits at each nodes level (e.g., 8 bits), which is likely consistent at every level but not necessarily so. If the sequence of bits already exists at the node, then logical router 101 follows a pointer corresponding to the bit sequence at that node to the next node in the trie. At the next node, it is determined whether the bit sequence following the outermost bit sequence is already in the next node. If the bit sequence is in the next node, then logical router 101 follows a pointer corresponding to that bit sequence to yet another node in the trie. If a particular bit sequence is not in a node, the sequence of bits is added to the node and a pointer is added that points to a newly created node for the trie, a process that will be repeated for each subsequent bit sequence in the network address at each new node.

Upon reaching a lowest node of the one or more tries, scenario 200 provides logical router 101 adding key information to the lowest node (202). The key information may include a VRF identifier (VRFID) for the logical network of which subnet domain 132 is a part, a level at which the lowest node is located, or some other type of identifier information. The key information is used, along with at least a second portion of the network prefix (e.g., the remaining bits not already accounted for in the one or more tries), to determine a key to a hash table. For example, the key information and the second portion of the network prefix may be input into a hash function produces a key to the hash table. The value associated with the key in the hash table indicates the routing information for the network prefix. For instance, the value itself may be the routing information or may represent a pointer to a memory location that stores the routing information. Using the example from above wherein the network prefix is for subnet domain 132, the routing information may include a media access control (MAC) address for logical router 102, a port for logical communication link 111, or any other information that indicates to logical router 101 that packets with that network prefix should be sent to logical router 102—including combinations thereof.

Once logical router 101 has entered the information discussed above in the one or more tries, the hash table, and the routing memory's location, if applicable, logical router 101 routes packets directed to the network prefix using hybrid routing table 121 (203). Of course, other network prefixes, such as those for subnet domain 133 and subnet domain 134, may also be added to hybrid routing table 121 using scenario 200.

Figure 3:
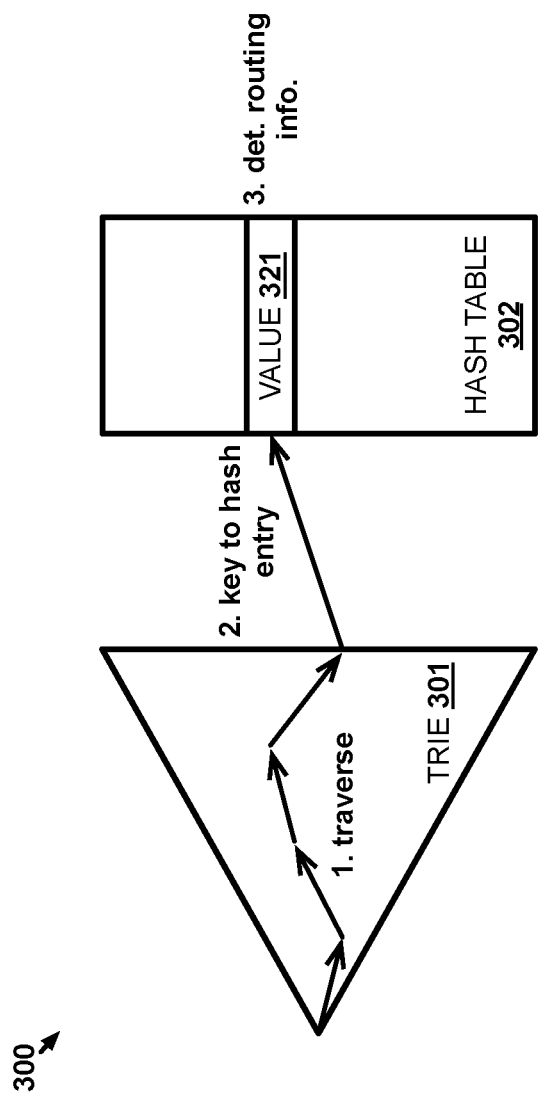
FIG. 3 illustrates another scenario for the implementation to route network traffic using a hybrid routing table.

FIG. 3 illustrates scenario 300 for implementation 100 to route network traffic using a hybrid routing table. Scenario 300 provides an example of how a packet is routed by logical router 101 using hybrid routing table 121. Scenario 300 includes trie 301 and hash table 302, which are the trie and hash table components of hybrid routing table 121. Upon receiving a packet directed to an IPv6 address, logical router 101 processes the network prefix of that address using hybrid routing table 121. Specifically, logical router 101 traverses trie 301 at step 1 with the outermost bits of the network prefix. During the traversal, logical router 101 steps from node to node in trie 301 as indicated by the pointers corresponding to each bit sequence in the network prefix until a lowest node in trie 301 for the network prefix is reached.

From the key information at the lowest node, logical router 101 determines the key to hash table 302 at step 2 by inputting the key information and at least the remaining bits of the network prefix (up to the entire IPv6 network address) into a hash function. The output of the hash function with those inputs is the key that is used to reference value 321 in hash table 302, as is common with key/value hash tables. Upon identifying value 321, logical router 101 is able to determine routing information at step 3 from value 321. As previously noted, value 321 may itself include the routing information or may include a pointer to routing information stored elsewhere in logical router 101's memory. Typically, routing information will indicate to logical router 101 a next hop to which the received packet should be directed. In this example, that next hop is logical router 102 and logical router 101, therefore, sends the packet to logical router 102 over logical communication link 111.

While scenario 200 and scenario 300 discuss the addition of routes to hybrid routing table 121 and use of hybrid routing table 121 when routing packets, it is also possible to remove routes from hybrid routing table 121. Essentially, the process to add routing information is performed in reverse. The routing information for a network prefix that is being removed is deleted from memory of logical router 101. Value 321 is deleted from hash table 302 but not before a pointer back to the lowest node of trie 301 is identified from value 321 (i.e., was included in value 321 when the route was initially added). The lowest node of trie 301 similarly includes pointers back to previous nodes so as logical router 101 can traverse trie 301 in reverse and delete the entries for the network prefix associated with the routing information being removed.

Figure 4:
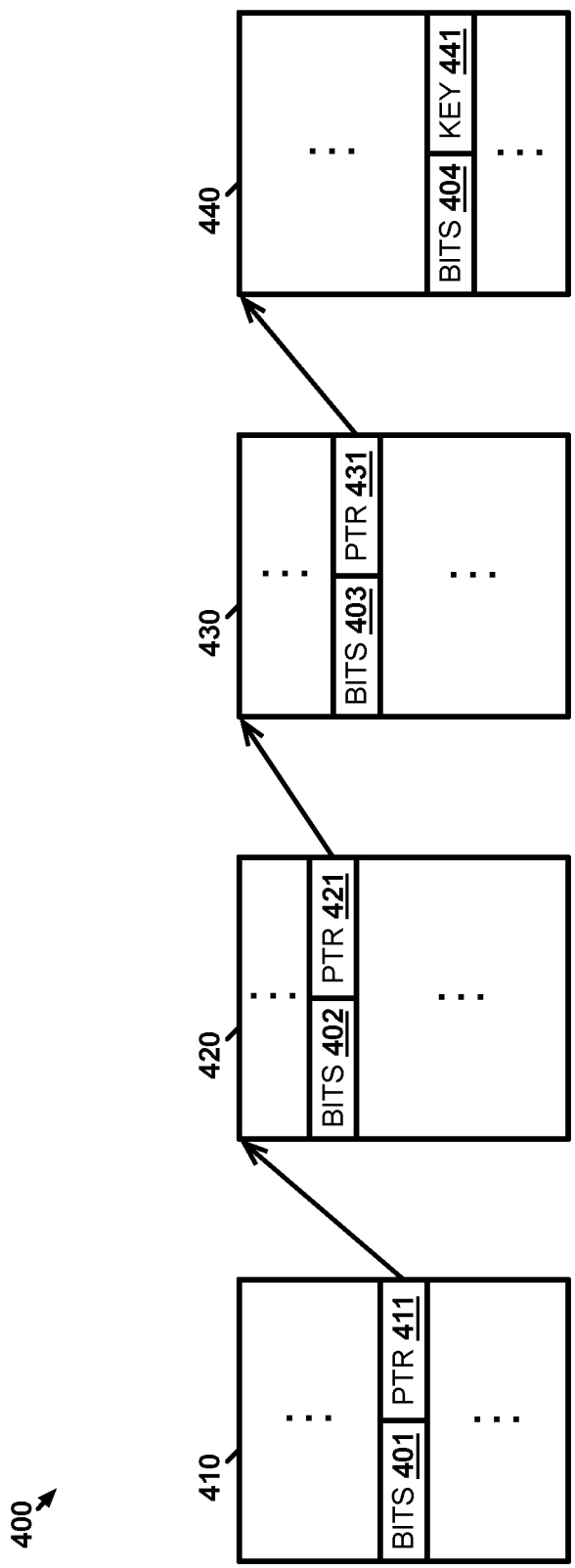
FIG. 4 illustrates another scenario for the implementation to route network traffic using a hybrid routing table.

FIG. 4 illustrates scenario 400 for implementation 100 to route network traffic using a hybrid routing table. Scenario 400 provides a more in-depth look at four nodes, node 410, node 420, node 430, and node 440, within trie 301. In this example, trie 301 is a 4-level, 8-bit trie. As such, node 410, node 420, node 430, and node 440 provide possible 8-bit combinations for a network prefix. Bits in node 410 represent the outermost 8 bits of a network prefix, bits in node 420 represent the next 8 bits of a network prefix, bits in node 430 represent the next 8 bits after that, and bits in node 440 represent the final 8 bits of the outermost 32 bits of a network prefix. While only one bit combination is shown per node (i.e., bits 401, bits 402, bits 403, and bits 404), it should be understood that each node may include other possible combinations of 8 bits depending on whether a network prefix corresponding to that combination has been entered into trie 301. Likewise, it should be understood that scenario 400 shows only one possible node traversal route from root node 410. As such, depending on the number of different network prefixes entered into trie 301, each level subsequent to node 410 may include more than the one node (e.g., a bit combination different from bits 401 may point to a different second level node than node 420).

Scenario 400 describes how trie 301 may be traversed for the first 32 bits of a network prefix. In this example, the network prefix comprises the first 64 bits of a 128 bit IPv6 network address. The first 32 bits of that network prefix are used to traverse trie 301. The first sequence of 8 bits of the network prefix are bits 401 (e.g., 10011010), the second sequence of 8 bits of the network prefix are bits 402, the third sequence of 8 bits of the network prefix are bits 403, and the final sequence of 8 bits are bits 404. In particular, since node 410 is the root node of trie 301, logical router 101 searches node 410 for bits 401 and identifies pointer 411. Pointer 411 points to the next node that logical router 101 should search during the traversal of trie 301. In this case, node 420 is the node to which pointer 411 points. Logical router 101 then searches node 420 for bits 402 and identifies pointer 421, which logical router 101 follows to node 430. Logical router 101 likewise searches node 430 for bits 403 and identifies pointer 431, which logical router 101 follows to node 440. Since node 440 is the lowest node in trie 301, when logical router 101 searches node 440 for bits 404, logical router 101 identifies key information 441 for referencing hash table 302 rather than a pointer to a next trie node.

It should also be understood that, at some point before a packet receiving the network prefix is received, bits 401, bits 402, bits 403, and bits 404 along with pointer 411, pointer 421, pointer 431, and key information 441 were added to trie 301 via steps 201 and 202 of scenario 200 described above.

In some examples, a network prefix may be less than the 32 bits and trie 301, as provided in scenario 400 can account for such situations. For instance, a network prefix for a certain domain may be configured to only comprise 24 bits. Using the bits exemplified in scenario 400, those bits would comprise bits 401 followed by bits 402 and then bits 403. When adding the network prefix to trie 301, only node 410, node 420, and node 430 would be reached. From node 430, pointer 431 may still point to node 440, although, since there are no more bits in the network prefix to compare to bits in node 440, logical router 101 would match to an entry representing that fact in node 440. That entry, instead of including key information like key information 441, would provide a pointer to routing information corresponding to the 24-bit network prefix. Alternatively, if node 440 was never created, such as may be the case before a network prefix containing bits 404 was entered into trie 301, pointer 431 may instead provide a pointer to the routing information. Then, if the network prefix containing bits 404 (or any other sequence of bits following bits 401, bits 402, and bits 403), pointer 431 may be changed to point to node 440 which will then include an entry pointing to the routing information.

Figure 5:
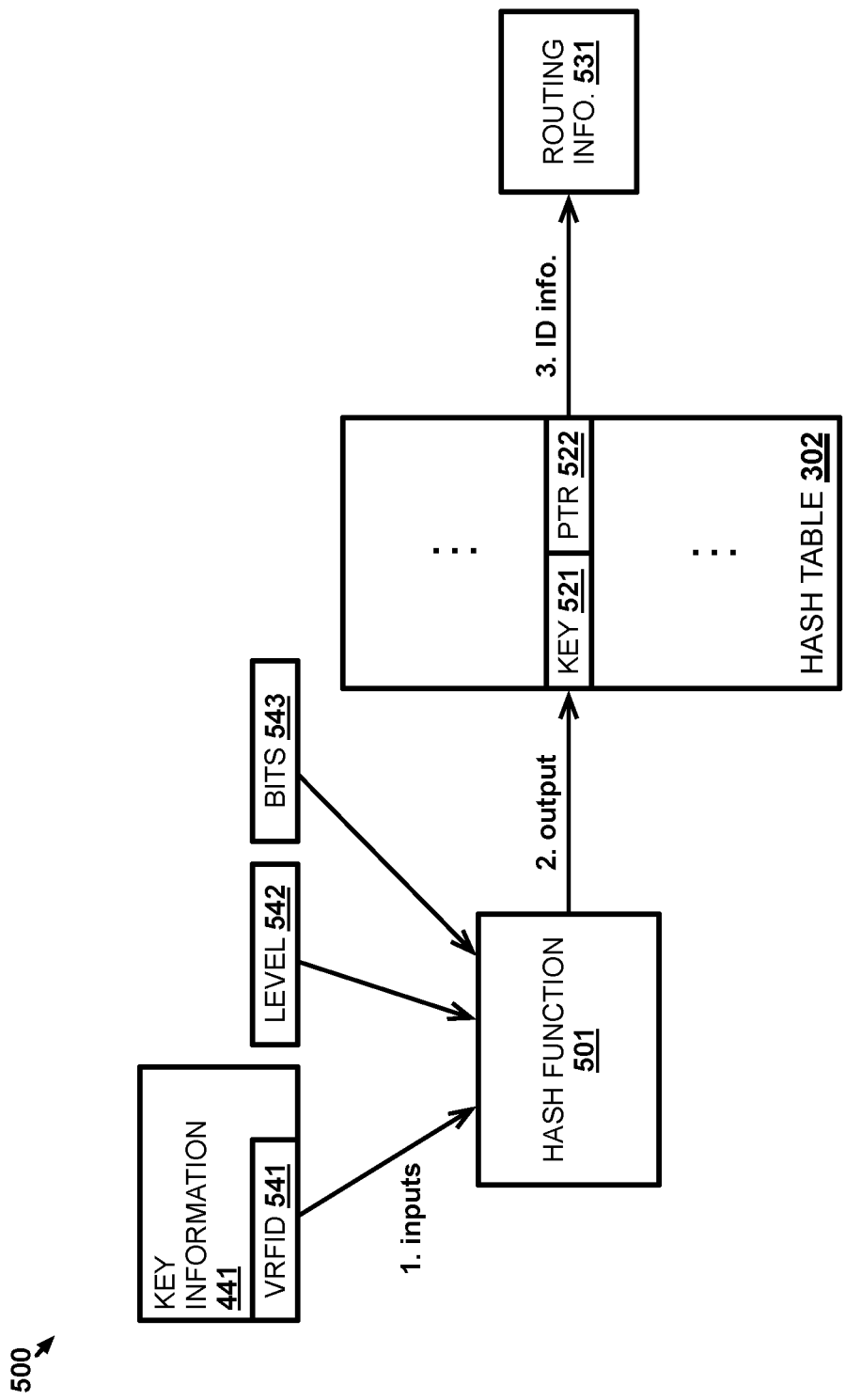
FIG. 5 illustrates a further scenario for the implementation to route network traffic using a hybrid routing table.

FIG. 5 illustrates scenario 500 for implementation 100 to route network traffic using a hybrid routing table. Scenario 500 is a continuation of scenario 400 once the lowest node of trie 301, node 440, is reached. At node 440, logical router 101 identifies key information 441 associated with the first 32 bits of the network prefix. Key information 441 includes VRFID 541 in this example. Since VRF allows multiple instances of a routing table to exist in a logical router and logical router 101 is only using a single hybrid routing table, VRFID 541 effectively segregates routing table entries that would otherwise be placed in a separate routing table. VRFID 541 along with trie level 542 and bits 543 are used as inputs by logical router 101 into hash function 501 at step 1. Bits 543 comprise at least the remainder of the network prefix, which may be up to 32 bits. Hash function 501 may be any hash function that allows the index of hash table 302 to be hash(keys) % the size of hash table 302.

Hash function 501 provides an output of key 521 at step 2. Key 521 references pointer 522, which is the value in hash table 302 corresponding to key 521. Pointer 522 points to a position in memory that stores routing information 531. Thus, logical router 101 uses pointer 522 to identify routing information 531 at step 3 for the network prefix. The packet having the network prefix is then routed to the next hop indicated by routing information 531. For instance, if the network prefix corresponds to subnet domain 133, then the packet is transferred over logical communication link 111 to logical router 103.

The pointers illustrated in scenario 400 and scenario 500 above are used to determine routing information for a network prefix. Some examples may further include pointers to the previous node entry in a manner similar to a doubly linked list. In those examples, when routing information and a corresponding route need to be removed from hybrid routing table 121 by logical router 101, logical router 101 can traverse hybrid routing table 121 in reverse and delete entries in hash table 302 and node 410, node 420, node 430, and node 440 that are no longer needed (i.e., entries that are no longer relevant to any remaining routing information).

Figure 6:
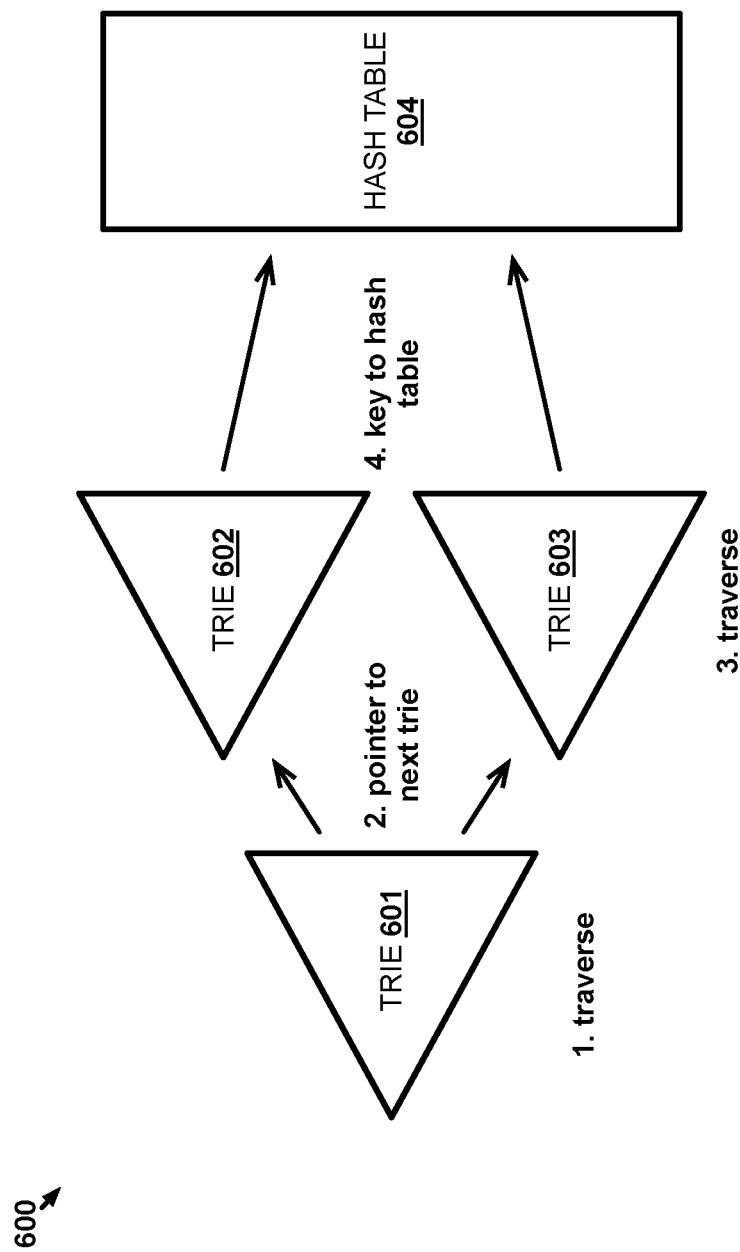
FIG. 6 illustrates yet another scenario for the implementation to route network traffic using a hybrid routing table.

FIG. 6 illustrates scenario 600 for implementation 100 to route network traffic using a hybrid routing table. In the above examples, only one trie and one hash table are used in combination. However, it is possible for multiple tries to be used in series. Scenario 600 illustrates two levels of tries with trie 601 being at the first level and acting as a "root" trie. Upon logical router 101 traversing trie 601 at step 1, the lowest node of trie 601 includes a pointer to the root node of either trie 602 or trie 603. To continue traversing the tries, logical router 101 follows the pointer to the next trie at step 2 and logical router 101 traverses either trie 602 or trie 603 at step 3, depending on which trie was pointed to. Once the lowest node of trie 602 or trie 603 is reached, key information at that node is used to reference a value in hash table 604 at step 4 in a manner similar to that described above.

The trie/hash table configuration described by scenario 600 may be used in situations where logical router 101 uses all 128 bits of an IPv6 address to lookup routing information. For instance, trie 601, trie 602, and trie 603, may be 4-level, 8-bit tries like trie 301 from the examples above. As such, 64 bits of the IPv6 address would be used to traverse the two levels of tries and at least the remaining 64 bits would be used along with key information to reference hash table 604.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method of using a hybrid routing table to route network packet traffic, the method comprising:
   adding a first portion of a network prefix to one or more tiers of one or more tries in the hybrid routing table;
   upon reaching a lowest node of the one or more tries when adding the first portion of the network prefix, adding key information to the lowest node, wherein the key information and at least a second portion of the network prefix comprise a key to locate a value in a hash table of the hybrid routing table, wherein the value indicates routing information for the network prefix; and
   routing packets using the hybrid routing table.

2. The method of claim 1, wherein routing packets using the hybrid routing table comprises:
   receiving a packet addressed to a network address having the network prefix;
   traversing the one or more tiers of tries using the first portion of the network prefix;
   using the key to locate the value in the hash table; and
   sending the packet to a next hop indicated by the routing information.

3. The method of claim 1, further comprising:
   inputting the key information and the second portion of the network prefix as inputs into a hash function, resulting in the key being generated as output of the hash function.

4. The method of claim 1, wherein the key information includes a Virtual Routing and Forwarding (VRF) identifier.

5. The method of claim 1, wherein the first portion of the network prefix comprises the outer 32 bits of an Internet Protocol version 6 (IPv6) network address.

6. The method of claim 5, wherein the second portion of the network prefix includes a remaining 0 to 32 bit portion of the network prefix.

7. The method of claim 1, wherein the one or more tries comprises a 4 level trie with each level representing 8 bits.

8. The method of claim 1, wherein the value comprises a pointer to the routing information.

9. The method of claim 1, wherein adding the first portion to the one or more tiers of one or more tries comprises:
   at each trie node of the one or more tries that is traversed, other than the origin node, including a previous node indicator, which indicates the previous trie node in the traversal.

10. The method of claim 9, wherein the value further indicates the lowest node and the method further comprising:
    removing the routing information from the routing table, wherein removing the routing information comprises:
    deleting the routing information and the value;
    identifying the lowest node as indicated by the value; and
    from the lowest node upward, using the previous node indicator included at each trie node to remove the first portion from the one or more tries.

11. An apparatus for using a hybrid routing table to route network packet traffic, the apparatus comprising:
    one or more computer readable storage media;
    a processing system operatively coupled with the one or more computer readable storage media; and
    program instructions stored on the one or more computer readable storage media that, when read and executed by the processing system, direct the processing system to:
    add a first portion of a network prefix to one or more tiers of one or more tries in the hybrid routing table;
    upon reaching a lowest node of the one or more tries when adding the first portion of the network prefix, add key information to the lowest node, wherein the key information and at least a second portion of the network prefix comprise a key to locate a value in a hash table of the hybrid routing table, wherein the value indicates routing information for the network prefix; and
    route packets using the hybrid routing table.

12. The apparatus of claim 11, wherein to route packets using the hybrid routing table, the program instructions direct the processing system to:

receive a packet addressed to a network address having the network prefix;

traverse the one or more tiers of tries using the first portion of the network prefix;

use the key to locate the value in the hash table; and send the packet to a next hop indicated by the routing information.

13. The apparatus of claim 11, wherein the program instructions further direct the processing system to:

input the key information and the second portion of the network prefix as inputs into a hash function, resulting in the key being generated as output of the hash function.

14. The apparatus of claim 11, wherein the key information includes a Virtual Routing and Forwarding (VRF) identifier.

15. The apparatus of claim 11, wherein the first portion of the network prefix comprises the outer 32 bits of an Internet Protocol version 6 (IPv6) network address.

16. The apparatus of claim 15, wherein the second portion of the network prefix includes a remaining 0 to 32 bit portion of the network prefix.

17. The apparatus of claim 11, wherein the one or more tries comprises a 4 level trie with each level representing 8 bits.

18. The apparatus of claim 11, wherein the value comprises a pointer to the routing information.

19. The apparatus of claim 11, wherein to add the first portion to the one or more tiers of one or more tries, the program instructions direct the processing system to:

at each trie node of the one or more tries that is traversed, other than the origin node, include a previous node indicator, which indicates the previous trie node in the traversal.

20. The apparatus of claim 19, wherein the value further indicates the lowest node and the program instructions further direct the processing system to:

remove the routing information from the routing table by:

deleting the routing information and the value;

identifying the lowest node as indicated by the value; and from the lowest node upward, using the previous node indicator included at each trie node to remove the first portion from the one or more tries.

\* \* \* \* \*